Figures 1, 2:
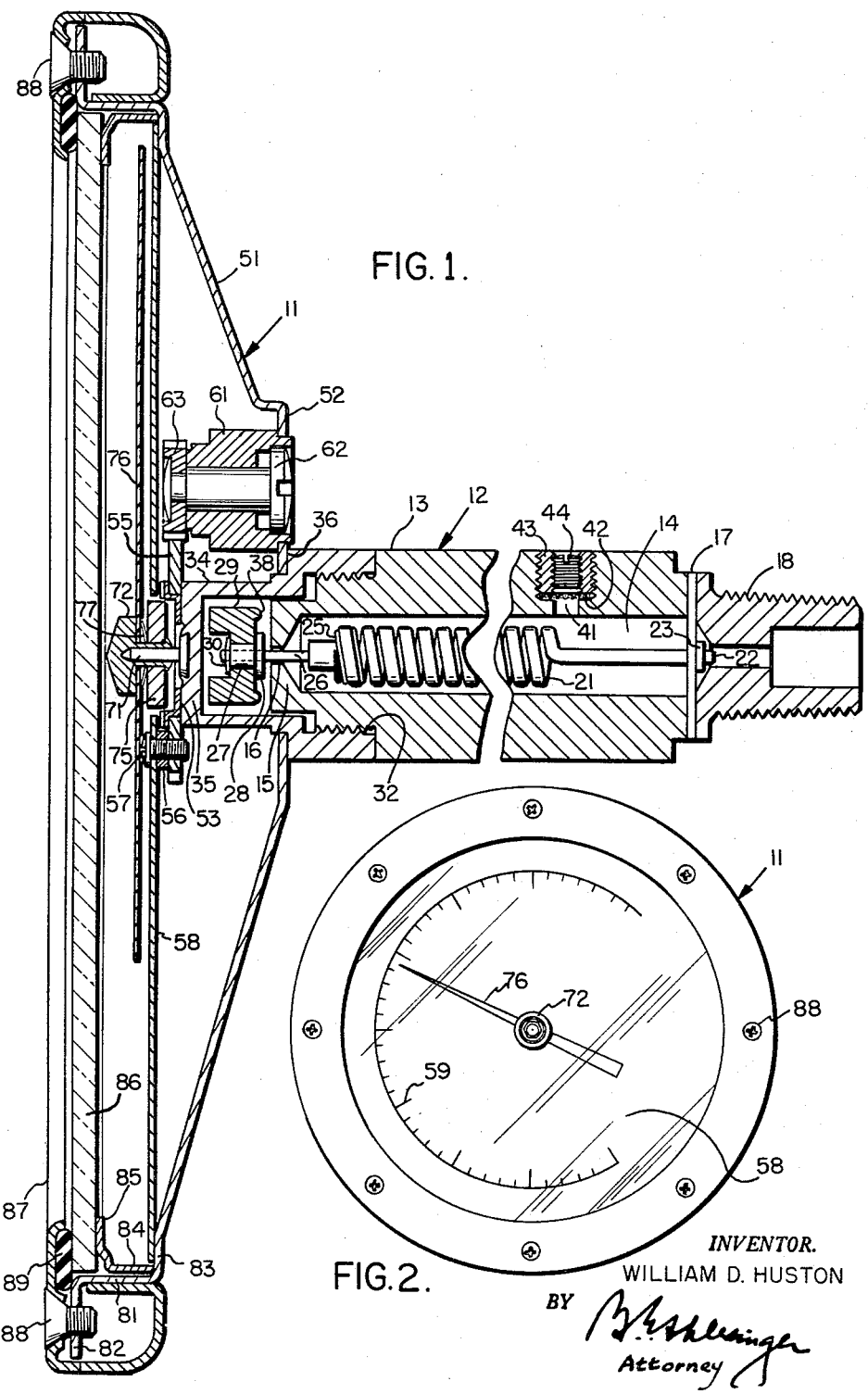

April 6, 1965     W. D. HUSTON     3,176,515

EXPLOSION-PROOF PRESSURE GAUGE

Filed Jan. 17, 1962

INVENTOR.
WILLIAM D. HUSTON
BY
Attorney

United States Patent Office 3,176,515
Patented Apr. 6, 1965

3,176,515
EXPLOSION-PROOF PRESSURE GAUGE
William D. Huston, Rochester, N.Y., assignor to American Radiator & Standard Sanitary Corporation, Rochester, N.Y., a corporation of Delaware
Filed Jan. 17, 1962, Ser. No. 166,861
3 Claims. (Cl. 73—416)

This invention relates to pressure gauges, and more particularly to dial-type pressure gauges.

Conventional pressure gauges are usually either of the Bourdon type or of the diaphragm type. With a diaphragm type gauge a pressure-operated diaphragm is used to transmit the pressure through leverage to the indicating pointer of the gauge. The chamber for applying pressure to the diaphragm is ordinarily outside the indicator casing; but the instrument is bulky and difficult to assemble. A Bourdon type gauge on the other hand is compact, but the tubular pressure actuated element is housed within the indicator casing of the gauge.

Though pressure gauges can be designed with a high burst pressure and a good safety factor, under extreme emergency conditions, a pressure gauge may be a hazard to life and property. An accidental failure in a pressure gauge can be more serious and damaging than a comparable failure in many other components in a pressurized system, for the pressure gauge is, by intent, designed to be read by an operator; should an accidental blow-out occur while the gauge is being read, there can be serious injury to the operator. When a non-breakable crystal is used on the gauge, the risk is perhaps less, but when a glass crystal is used on the gauge, the risk is extreme.

When used on liquid and hydraulic systems, the hazard is less for the fluid will normally be restricted in the pressure line, and the pressure build up in the gauge will be slow. Even here, however, if the liquid is toxic or corrosive, the danger to personnel and property can be high.

The danger is more extreme in gas systems, where a burst in the system can result in an explosive disintegration of the cover glass in a pressure gauge as the gas expands to atmospheric presure.

A more extreme risk is in a gas system containing oxygen which can generate a local explosion by internal friction, or shock wave within the pressure gauge itself. In cases of this kind, the sudden pressure created by the local explosion is added to the system pressure and together produces a sudden burst and a shock wave against the cover glass of the pressure gauge.

Again, in gas systems, whether in indicating dial type instruments, or in transmitters, actuators or other pressure operated devices, if the fluid is toxic or corrosive, failure of the pressure measuring element can create considerable damage in the surrounding area from a sudden rupture or failure of the pressure element.

Heretofore, pressure gauges for applications where the risk of failure was great, were designed with a fully open back on the pressure gauge, and with a nominally closed barrier wall between the pressure measuring element and the indicating dial and cover glass chamber of the pressure gauge. Gauges of this class are commonly called solid front gauges or safety gauges. In this design, the barrier wall between the pressure element and the dial and cover glass were left open at the center. The pointer shaft was extended from the back of the case through the barrier wall to carry the pointer. For less severe applications, this design has been adequate. In practice, it has been found, however, that where the open back of the case is mounted against a panel or wall or is covered in any way, the pressure build up within the case may not be relieved freely through the back of the case and the cover glass will burst as the pressure builds up in the chamber between the dial and the cover glass. The "solid front" construction is normally associated with pressure gauges which consist of a "C" spring Bourdon tube that operates through a gear mechanism to drive the pointer. In this type of gauge, because of the low driving energy there is no possibility of adding a sealing gland or a close fitting bushing to seal-off the pressure between the front and back of the gauge.

A primary object of this invention is to provide an explosion-proof pressure gauge which is simple and compact, yet efficient for its purpose.

Another object of this invention is to provide an explosion-proof pressure gauge which may be employed to measure the pressure of combustible gases, toxic fluids, or the like, without danger to either personnel or property should the gauge's pressure actuated element fail.

A more specific object of this invention is to provide an explosion-proof pressure gauge employing a Bourdon tube as the pressure-actuated element, but in which the pressure actuated element is enclosed in a chamber which is completely sealed off from the gauge dial, casing and cover.

Other objects of the invention will be apparent hereinafter from the specification and from the recital of the appended claims, particularly when read in conjunction with the accompanying drawing.

In the drawing:
FIG. 1 is a sectional view taken along the axis of an explosion-proof pressure gauge made in accordance with one embodiment of this invention; and
FIG. 2 is a front elevational view on a reduced scale, looking at the left end of FIG. 1.

Referring now to the drawing by numerals of reference, the pressure gauge made in accordance with the preferred embodiment of this invention comprises two housings designated generally at 11 and 12. Housing 11 contains the gauge dial and cover glass assembly, and housing 12 contains the pressure actuated element of the gauge.

Housing 12 comprises an elongate generally cylindrical member 13 which has an axially extending chamber 14. Adjacent its forward end member 13 has a transverse end wall 15, and which has a hole 16 through it that communicates with chamber 14. A circular disc 17 is welded over the rear end of member 13; and an externally threaded and axially bored bushing 18 is welded to the rear face of disc 17 to be threaded into a vessel containing the fluid whose pressure is to be measured.

Mounted in the chamber 14 and extending axially thereof is a helically wound Bourdon tube 21, one end 22 of which is open and which extends through disc 17 into the bore of bushing 18. The open end 22 of Bourdon tube 21 is secured in a stationary position in bushing 18 by means of a snap ring 23. At its opposite end the Bourdon tube 21 is secured about and to the peripheral surface of a bearing block 25 which may be of the type shown in my copending application Serial No. 850,317. Rigid with the bearing block 25 and extending axially through the hole 16 in the forward end wall 15 of member 13 is a stem 26. An annular bushing 27, which has a flange 28 at one end thereof, is secured on the stem 26. A generally cylindrical magnet 29 is positioned on the bushing 27 with one face abutting against flange 28. The magnet is secured to stem 26 by a nut 30. Upon admission of fluid under pressure to the open end 22 of the helical coil 21 a rotary motion will be impared to bushing 25, stem 26 and to magnet 29.

The member 13 has a reduced diameter threaded portion 32 adjacent its forward end; and the housing 11 is secured on housing 12 by the inverted cup-shaped fitting 34 which is welded to and forms part of housing 11 and which threads on the threaded portion 32 of the member 13. The closed end 35 of fitting 34 has its inner face slightly spaced from and confronting the magnet 29. Fitting 34 thus encloses magnet 29.

If desired, member 13 may be provided with a vent opening 41 through which a harmless fluid leaking from the Bourdon tube 21 may be vented. Preferably a filter element 42 is mounted in vent opening 41 and is held in place by a nut 43 and a vent plug or valve 44. Valve 44 is threaded into the threaded bore of ring nut 43.

Housing 11 comprises a relatively shallow, cup-shaped casing 51 having its bottom 52 welded to fitting 34 and abutting its circumferential shoulder 36 so that fitting 34 extends into casing 51.

Secured in an aperture in the bottom 52 of casing 51 and extending laterally inwardly therefrom toward the interior of the casing is an axially bored bearing block 61. Rotatably mounted in the bore of block 61 is a stud 62, the outer, lower end of which is kerfed for engagement by a screw driver, and the upper or inner end of which has a spur gear 63 riveted coaxially thereon. The gear 63 meshes with an annular spur gear 55. This gear is journaled on a bushing 53 which is secured to the bottom 35 of fitting 34; and gear 55 is secured by screws 57 to a graduated dial 58. Washers 56, which surround the screws 57, space dial 58 from gear 55.

Welded or brazed to the exterior upper face of fitting 34 and projecting upwardly therefrom through an axial bore in the dial plate 58 is a fixed pivot pin 71. Pin 71 has a cap bearing 72 rotatably mounted over the upper end thereof. An annular magnet 75 is mounted on bearing 72 in alignment with magnet 29 to be actuated thereby. A pointer 76 is also mounted on bearing 72 to overlie the calibrated face of dial plate 58. A spring washer 77 is interposed between the confronting faces of the magnet 75 and the pointer 76 to hold them in place on bearing 72 so that magnet 75 and pointer 76 will revolve as a unit about the fixed pivot 71.

Casing 51 at its open end is shaped to provide an annular wall portion 81 and an outwardly directed flange 82. At its closed end the casing 51 has a flat surface 83 which supports the dial plate 58. Fitted snugly within the annular wall 81 of casing 51 is a ring 84 one end of which is seated upon the shoulder portion 83 and the other end of which has an inwardly directed flange 85. Resting upon lateral flange 85 is a glass cover disc 86. Cover disc 86 is held securely in the casing 51 by means of a conventional bezel 87. Bezel 87 is secured to the flange 82 on casing 51 by means of screws 88. An annular rubber gasket 89 or the like is interposed between bezel 87 and the cover 86 whereby glass 86 is sealingly secured over the open end of casing 51 to prevent the entry of dust or moisture thereinto.

In operation the gauge is calibrated by rotating dial plate 58 by screw 62 so that the preferred or the zero reading of the indicia 59 on the dial plate will be positioned beneath the pointer 76.

When fluid under pressure is admitted to the bore of bushing 18 from a pressurized vessel or system it enters the open end of Bourdon tube 21 to rotate magnet 29. The magnetic field effectively locks magnet 75 with magnet 29 so that both elements rotate together. Rotation of magnet 75 in turn causes pointer 76 to rotate relative to dial plate 58, thereby indicating changes in pressure which are readily observable through the glass cover 86. If for any reason Bourdon tube 21 should fail, fitting cap 34 serves to seal off or effectively isolate the leaking, pressurized fluid from housing 11 and the dial and cover glass assemblies thereof. If the fluid is the type which would not necessarily constitute a danger to either personnel or property upon its being exhausted to the atmosphere, plug 44 in the side of jacket 13 may be opened to permit the pressurized fluid, which leaks from Bourdon tube 21 to exhaust to atmosphere.

With this design, the pressure measuring element can be fully isolated. The dial, pointer and glass assembly in the dial chamber is completely isolated from the pressure measuring element. With this construction, any failure or leakage of the pressure measuring element cannot affect the dial chamber in any way and cause glass failure in the dial chamber. The pressure measuring element may be designed to be fully sealed in a housing of such strength to withstand the maximum pressure that will ever be encountered, or, the pressure measuring element housing may be designed with a vent connection so that the products of any explosion may be carried away to a safe area by a pipe connection.

By having a fully sealed chamber, the pressure gauge is not only explosion proof in the sense of preventing glass breakage or case damage, but is also explosion proof in the sense that the explosive products can be retained and controlled and disposed of in a safe and convenient manner.

The first advantage of the design is to eliminate the hazard to the operator when reading a pressure gauge.

A second advantage is the means to contain and control toxic and corrosive products resulting from an emergency burst of a pressure measuring element.

A third advantage, and one that is over and above the explosion proof feature, is that it is desirable in any dial indicating instrument, to prevent breathing and moisture condensation on the interior of the dial chamber of an instrument. When a dial chamber is vented and breathes ambient air, moisture will necessarily collect within the chamber with the result that moisture will condense on the crystal and dial, the dial may become discolored and under freezing conditions, the interior may become frosted and moving parts may freeze. With the present construction, the dial chamber of the pressure gauge can be fully sealed to prevent breathing and problems of fogging, frosting, corrosion and freezing can be fully eliminated. Further with a sealed dial chamber, dust, smoke and corrosion from, for example, salt in the air, will be eliminated and the dial and pointer will remain clear and clean and fully readable after many years of service.

While the invention has been described in terms of a helically wound Bourdon coil for use as a pressure measuring element, it is to be understood that a spiral wound Bourdon element could be utilized instead. Moreover, if the pressurized fluid contained in a pressure measuring element happens to be particularly combustible, toxic or otherwise dangerous to personnel or property, plug 44 and jacket 13 could be replaced by a pipe which could be employed to convey leaking fluid from within jacket 13 to a receiver or the like remote from the gauge. Alternatively, plug 44 and sleeve 43 can be replaced by a blowout disc or seal to provide a safety valve in the side of jacket 13.

Furthermore, while the invention has been described in connection with pressure gauges it will be understood that certain features thereof are applicable to other types of gauges as, for instance, thermometers employing helically or spirally wound bimetallic elements as the actuating means. Where the tube housing the bimetallic element is plunged into a very hot liquid there is always danger of rupture of the tube. Furthermore, where such a thermometer is used to measure temperatures in excess of 800° F., the bimetallic element is likely to become corroded through oxidization. The gauge construction of the present invention, when applied to a thermometer having a bimetallic actuating element, will protect the indicating mechanism of the thermometer and its housing against damage from explosion, and has the advantage of sealing the housing for the bimetallic element so that even at temperatures in excess of 800° F. there is protection against corrosion by oxidization.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. A pressure gauge comprising a housing having a sealed chamber therein, a helically wound Bourdon tube mounted in said chamber with the open end of said tube fixed in said housing adjacent one end of said chamber for communication with a supply of fluid under pressure at the exterior of said chamber, a stationary wall in said housing extending transversely across said chamber between said tube and the opposite end of said chamber, a stem secured to the closed end of said tube and journaled in a central opening in said wall for rotation relative to said housing upon the expansion and contraction of said tube in response to changes in fluid pressure, a magnet secured to said stem for rotation therewith in said chamber on the side of said wall remote from said tube, indicator means mounted on the exterior of said housing at said opposite end of said chamber and including a graduated dial and a pointer, respectively, one of which is rotatable relative to the other, a paramagnetic element secured to the rotatable part of said indicator means and disposed in operative relation with said magnet so that rotation of said magnet causes a corresponding rotation of said paramagnetic element and said indicator part secured thereto, and a casing surrounding said indicator means and secured at one end to said housing, said casing having a transparent cover secured in the opposite end thereof and confronting said indicator means so that the latter is viewable through said cover, a second wall enclosing, with the first-named wall, said magnet and disposed between said magnet and said casing to shut off said housing and said chamber completely from said casing, and a second stem in said second wall and extending therefrom into said casing, said paramagnetic element being mounted on said second stem.

2. A pressure gauge as defined in claim 1 wherein the side wall of said housing has an exhaust port therethrough communicating with said chamber, and means are secured in said wall for closing said port, said last-named means being movable relative to said housing for opening said port.

3. A pressure gauge comprising a closed casing having a transparent cover at one end, a housing sealingly secured at one end in an aperture in said casing opposite said cover and extending outside of said casing, a graduated dial and a rotatable pointer mounted in said casing and viewable through said cover, a first stem mounted on said one end of said housing in said casing, a paramagnetic element rotatably mounted on said first stem and connected to said pointer, a helically coiled Bourdon tube mounted in a sealed chamber in said housing, said tube having an open end, secured in a stationary position in said housing, for communication with a supply of fluid under pressure at the exterior of said chamber, and a closed end movable relative to said housing, a block secured to the closed end of said tube coaxially of the tube convolutions for rotation therewith upon the expansion and contraction of said tube in response to pressure changes in the fluid, a second stem secured to said block coaxially with the tube convolutions to rotate with said block, a magnet connected to said second stem and mounted in said chamber to rotate upon expansion and contraction of said tube, said magnet being disposed coaxially of said first stem in operative relation to said paramagnetic element so that upon rotation of said magnet its magnetic field is operative to impart a corresponding rotation to said paramagnetic element and to the pointer connected thereto.

References Cited by the Examiner

UNITED STATES PATENTS

| 1,116,938 | 11/14 | Sheldon | 73—411 X |
| 1,461,200 | 7/23 | Strandell | 73—416 |
| 2,522,007 | 9/50 | Willach | 73—416 X |
| 2,917,922 | 12/59 | Morse | 73—228 |

FOREIGN PATENTS

| 10,984 | 5/09 | Great Britain. |

RICHARD C. QUEISSER, *Primary Examiner.*

ROBERT L. EVANS, *Examiner.*